United States Patent
Hilfrich

(10) Patent No.: US 7,958,638 B2
(45) Date of Patent: Jun. 14, 2011

(54) METHOD FOR THE PRODUCTION OF A SHEET METAL PLATE, IN PARTICULAR OF STEEL, FOR THE MANUFACTURE OF MOTOR VEHICLE BODY COMPONENTS

(75) Inventor: Erik Hilfrich, Düsseldorf (DE)

(73) Assignee: ThyssenKrupp Steel AG, Duisburg (DE)

( * ) Notice: Subject to any disclaimer, the term of this patent is extended or adjusted under 35 U.S.C. 154(b) by 712 days.

(21) Appl. No.: 10/575,669

(22) PCT Filed: Sep. 24, 2004

(86) PCT No.: PCT/EP2004/010763
§ 371 (c)(1),
(2), (4) Date: Mar. 4, 2008

(87) PCT Pub. No.: WO2005/051747
PCT Pub. Date: Jun. 9, 2005

(65) Prior Publication Data
US 2008/0268277 A1    Oct. 30, 2008

(30) Foreign Application Priority Data
Oct. 30, 2003 (DE) .................. 103 50 670

(51) Int. Cl.
*B62D 29/00* (2006.01)
*B23K 31/02* (2006.01)

(52) U.S. Cl. ........... 29/897.2; 29/429; 29/469; 228/152; 228/170; 228/178; 428/577; 428/600; 428/683

(58) Field of Classification Search .................. None
See application file for complete search history.

(56) References Cited

U.S. PATENT DOCUMENTS

| | | | | |
|---|---|---|---|---|
| 5,724,712 A * | 3/1998 | Bishop | ............................ | 29/430 |
| 6,048,628 A * | 4/2000 | Hillmann et al. | ............. | 428/594 |
| 6,426,153 B1 * | 7/2002 | Duley et al. | .................... | 428/577 |
| 6,513,860 B1 * | 2/2003 | Ourchane et al. | ........... | 296/146.5 |
| 6,536,254 B1 * | 3/2003 | Kawalla et al. | ................. | 72/200 |
| 6,608,285 B2 * | 8/2003 | Lefebvre et al. | ........... | 219/137 R |
| 6,642,474 B2 * | 11/2003 | Delle Piane et al. | ..... | 219/121.64 |
| 2002/0023475 A1 * | 2/2002 | Hauger | ........................... | 72/359 |

(Continued)

FOREIGN PATENT DOCUMENTS

DE         19534127         3/1996

(Continued)

OTHER PUBLICATIONS

XP 000725079, Jun. 6, 1997.

(Continued)

*Primary Examiner* — John J Zimmerman
(74) *Attorney, Agent, or Firm* — Proskauer Rose LLP

(57) ABSTRACT

The invention relates to a sheet metal plate, especially made of steel, for producing motor vehicle body components. In order to make the body component sufficiently rigid at highly stressed points in spite of using lightweight materials, the sheet metal plate (11) is provided with local reinforcement zones (13, 14). To this avail, the sheet metal plate (11) is joined together from at least two cut metal sheets (7, 9) with a straight seam (10). At least one of the cut metal sheets (7) comprises several parallel strips (2 to 6) having different strengths while each local reinforcement zone (13, 14) lies within a reinforced strip (2, 3).

5 Claims, 2 Drawing Sheets

U.S. PATENT DOCUMENTS

| | | | |
|---|---|---|---|
| 2003/0087117 A1* | 5/2003 | Duley et al. | 428/594 |
| 2004/0107757 A1* | 6/2004 | Arns | 72/185 |
| 2005/0013954 A1* | 1/2005 | Kaegi et al. | 428/36.9 |
| 2005/0014015 A1* | 1/2005 | Hauger | 428/600 |
| 2005/0244667 A1* | 11/2005 | Hauger | 428/600 |

FOREIGN PATENT DOCUMENTS

| | | | |
|---|---|---|---|
| DE | 19524235 | | 1/1997 |
| EP | 0788849 | * | 8/1997 |
| EP | 1149719 | | 10/2001 |
| JP | 2000-158165 | * | 6/2000 |
| JP | 2002-160020 | * | 6/2002 |
| WO | WO 00/00320 | | 1/2000 |

OTHER PUBLICATIONS

XP 000600330, Jan. 1, 1992.

* cited by examiner

METHOD FOR THE PRODUCTION OF A SHEET METAL PLATE, IN PARTICULAR OF STEEL, FOR THE MANUFACTURE OF MOTOR VEHICLE BODY COMPONENTS

CROSS-REFERENCE TO RELATED APPLICATIONS

This application is a National Phase Application of International Application No. PCT/EP2004/010763, filed on Sep. 24, 2004, which claims the benefit of and priority to German patent application no. DE 103 50 670.5, filed on Oct. 20, 2003. The disclosures of the above applications are incorporated herein by reference in their entirety.

FIELD OF THE INVENTION

The invention relates to a sheet metal plate, in particular of steel, for the manufacture of motor vehicle body components, with at least one local reinforcement zone.

BACKGROUND

Sheet metal plates of this kind are known. Motor vehicle body components are cut out from them, such as the inside panels of doors or bonnets and hatchbacks. In order on the one hand to satisfy the requirements for the lowest possible weight and, on the other, for sufficient strength at critical points, such as the connection points for hinges, the principle is known of welding shaped reinforcing sheets with non-linear seam runs into cut-outs in the sheet metal plates (DE 195 24 235 A1). The production of such sheet metal plates with local reinforcements is elaborate and leads to not inconsiderable amounts of scrap.

SUMMARY OF THE INVENTION

The invention is based on the object of developing a sheet metal plate which satisfies the requirements for lightweight construction in conjunction with adequate strength in areas subject to high mechanical stress, which is simple to manufacture and does not incur any scrap.

This object is achieved according to the invention by a sheet metal plate of the type referred to in the preamble in that the sheet metal plate is joined from at least two sheet metal sections with join lines running straight, whereby at least one of the sheet metal sections exhibits several strips of differing thickness running parallel to one another and each local reinforcement zone lies in a reinforced strip.

From the technical manufacturing point of view, the invention is characterised by the following steps:
a) In a continuous production process, a sheet metal strip is produced with strips of differing thickness and/or quality running parallel to the longitudinal direction of the sheet strip.
b) Individual sheet metal sections with straight cut edges are cut to length from the sheet metal strip.
c) A first sheet metal section of this sheet strip is joined to a second sheet metal section, with a join line running straight and transversely to the longitudinal direction of the strips of the first sheet metal section, in such a way that the strips with greater thickness and/or higher quality form the local reinforcement zones.

With the invention the advantages of the continuously produced striated strip are exploited, in order to obtain one or more reinforced zones at a specific point of the sheet metal plate or at several specific points of the sheet metal plate. In this situation, the striated sheet is only used at the place at which a reinforced zone is desired. In the remaining area a simple sheet can be used. The particular advantages of the invention lie in the fact that only a minimum of joining steps are required with linear seam runs, specifically the joining step during the production of the striated strip and the joining step for the sheet metal section of this strip and the second sheet metal section. This means that the otherwise usual elaborate production steps of cutting out and inserting reinforced sheets with non-linear join seams can be dispensed with. This means that, according to the invention, sheet metal plates with high flexibility can be produced comparatively economically without scrap.

It is understood that the arrangement of the strips is matched to the individual component. Provision is made within the framework of the invention for a striated strip to be joined to a non-striated strip or a striated sheet strip of the same or a different kind. The selection of the sheet strips is based on the component which is to be manufactured, whereby striated sheet strips are only used in the areas where reinforcements are desired.

BRIEF DESCRIPTION OF THE DRAWINGS

The invention is explained hereinafter on the basis of drawings. Specifically, these show.

DETAILED DESCRIPTION

Figure 1:
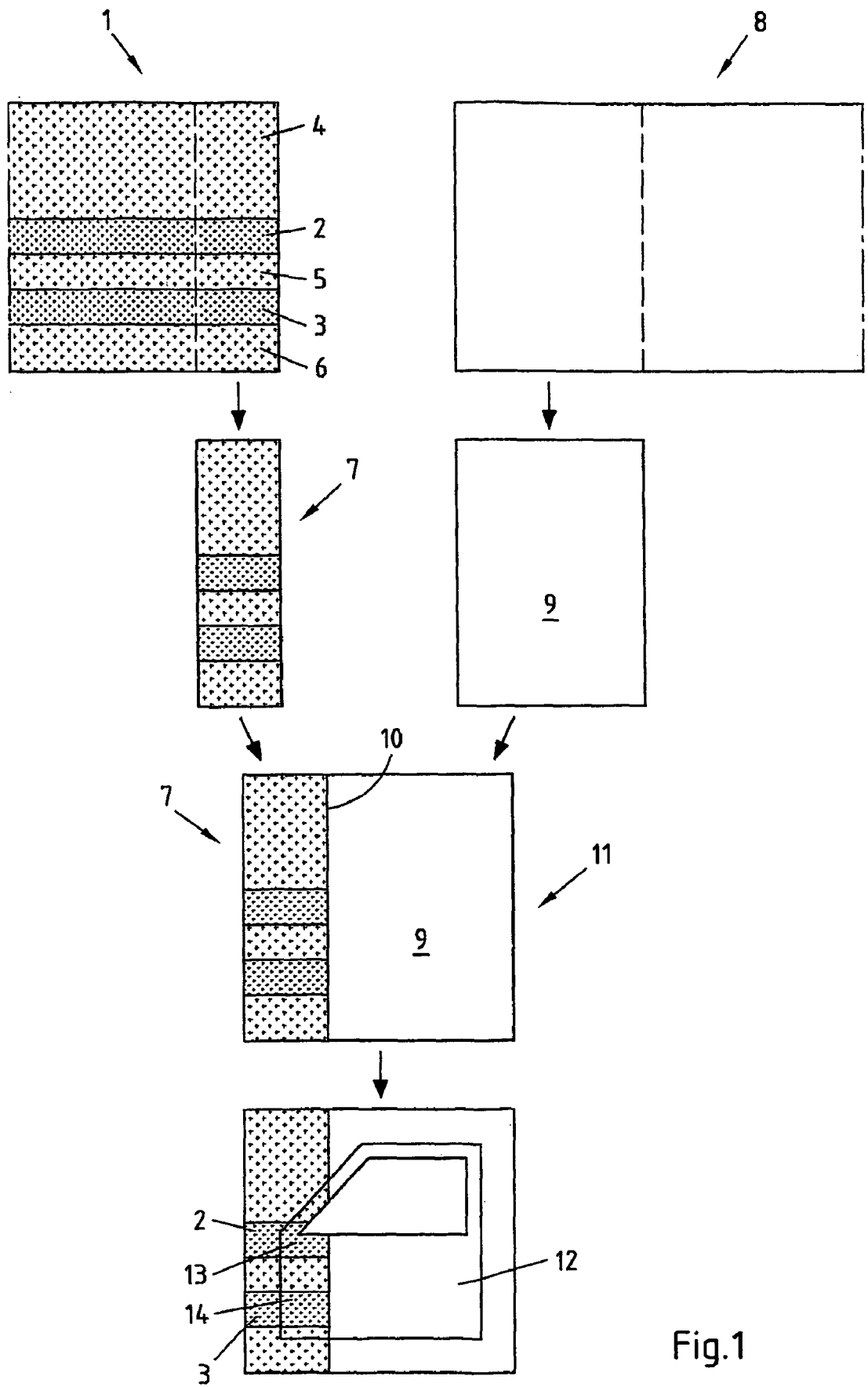
FIG. 1 Different production steps of a sheet metal plate for the inside panel of a door of a motor vehicle, in a diagrammatic representation,
FIG. 2 A cut-out sheet metal plate for the inside panel of a hatchback of a motor vehicle, and
FIG. 3 A cut-out sheet metal plate for the inside panel of a bonnet of a motor vehicle.

The principle according to the invention is shown clearly by the example of the production of an inner panel of a door in accordance with FIG. 1.

A longitudinally striated sheet strip 1 is taken as the starting point, which is produced in a continuous production process by the profile rolling or joining of individual strips 2 to 6 by means of lasers. This sheet strip 1 exhibits two thicker strips 2, 3. The other strips 4, 5, 6 are, by contrast, thinner. From the sheet strip 1, individual sheet metal sections 7 are cut to length by means of a straight cut running transverse to the longitudinal direction of the sheet strip. The cut may, as a departure from the embodiment example, also run obliquely to the longitudinal direction of the sheet strip; the important factor is the straight cut edge.

Parallel to this, sheet metal sections 9 are cut to length by straight cuts likewise running transversely or obliquely to the longitudinal direction of the sheet strip, taken from a second sheet strip 8, which is comparatively thin and can correspond in thickness to the thin strips 4, 5 and 6 of the first sheet strip 1. The two different sheet metal sections 7, 9, with straight cut edges, are then butted together and joined, in particular by means of a laser welding beam, so that a straight join line 10 results. No scrap is incurred in the individual production steps.

The inside panel 12 of a door is then cut out of the sheet metal plate 11. It can be seen from the lower diagram in FIG. 1 that the local reinforcement zones 13, 14 then come to lie in the thicker strips 2, 3, in which the door hinges can be located. The cut-out door inside panel 12 is then given its final shape in a press, which is not represented in FIG. 1.

Figure 2:
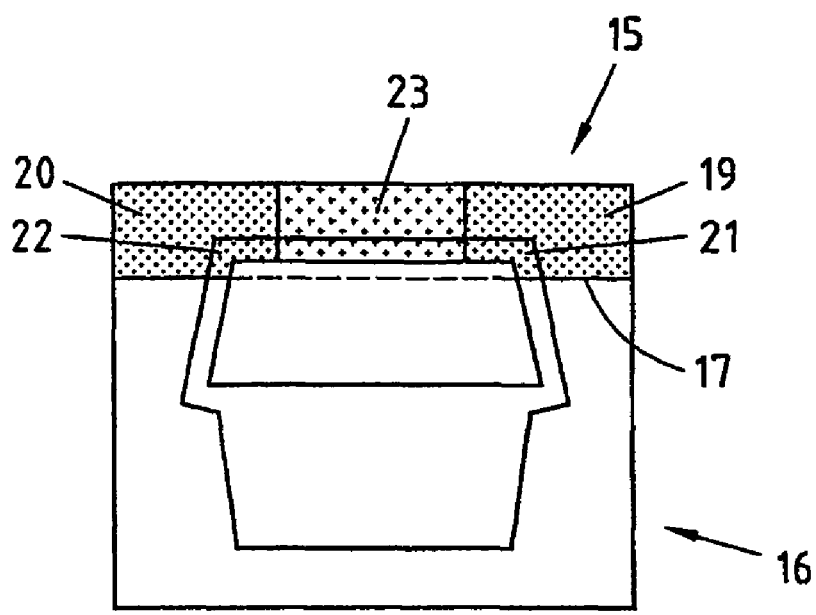

The embodiment example in FIG. 2 shows a sheet metal plate, which is joined from a triple-striated sheet metal section 15 and a non-striated sheet metal section 16 with a straight join line 17. In this case, the outer strips 19, 20 consist of a thicker sheet, since in these areas the local reinforcement zones 21, 22 for hinges will be located. The middle strip 23 is comparatively thin.

Figure 3:
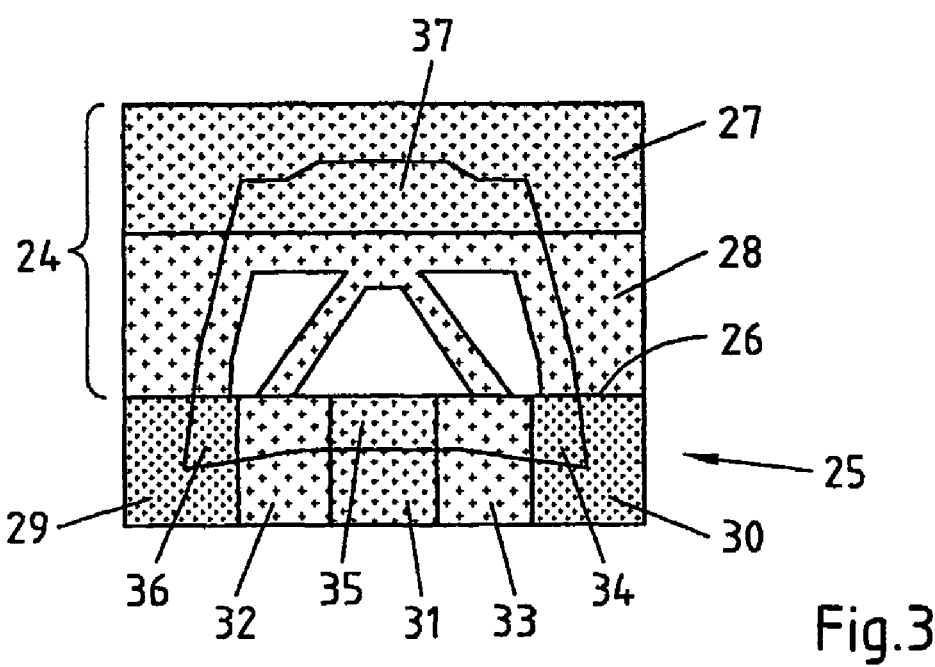

The sheet metal plate of the embodiment example from FIG. 3 is joined from two sheet metal sections 24, 25 of differently striated sheet strips with a join line 26 running straight. The sheet metal section 24 consists of a strip 27 of a thicker sheet and a strip 28 of a thinner sheet, while the sheet metal section 25 consists of a sheet strip with two outer strips 29, 30 of a thicker sheet, a middle strip 31 of a somewhat thinner sheet, and, located between them, two strips 32, 33 of a still thinner sheet. In this case too, the differing thickness of the sheet in the individual areas takes account of the local requirements for mechanical stability. Only in areas where the requirements for mechanical stability are low is the thinnest possible sheet used. Accordingly, the sheet thickness in the reinforcement zones 34 to 37 is greater than in other areas.

The invention claimed is:

1. Method for the production of a sheet metal plate, for the manufacture of motor vehicle body components with at least one local reinforcement zone, comprising the following steps:

a) producing, in a continuous production process, a sheet metal strip with strips of differing thickness and/or quality running parallel to the longitudinal direction of the sheet strip;

b) cutting individual sheet metal sections with straight cut edges to length from the sheet metal strip; and c) joining a first sheet metal section of this sheet metal strip to a second sheet metal section, with a join line running straight and transversely to the longitudinal direction of the strips of the first sheet metal section, in such a way that the local reinforcement zones come to lie in the strips with greater thickness and/or higher quality.

2. Method according to claim 1, wherein the sheet metal plate is joined from two sheet metal sections of striated sheet strips.

3. Method according to claim 2, wherein the striated sheet strips are differently striated.

4. Method according to claim 2, wherein the sheet metal plate is jointed from two sheet metal sections of striated sheet strips and of one non-striated sheet strip.

5. Method according to claim 1, wherein the sheet metal plate is steel.

* * * * *